(12) United States Patent
Ando

(10) Patent No.: US 8,204,464 B2
(45) Date of Patent: Jun. 19, 2012

(54) WIRELESS COMMUNICATION APPARATUS, ITS CONTROL METHOD, AND RECORDING MEDIUM

(75) Inventor: Muneki Ando, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 12/727,731

(22) Filed: Mar. 19, 2010

(65) Prior Publication Data
US 2010/0240322 A1    Sep. 23, 2010

(30) Foreign Application Priority Data
Mar. 23, 2009  (JP) ................. 2009-069948

(51) Int. Cl.
H04B 17/00 (2006.01)
H04B 1/06 (2006.01)
H04B 7/00 (2006.01)

(52) U.S. Cl. .................... 455/226.2; 455/230

(58) Field of Classification Search .............. 455/556.1, 455/67.11, 67.13, 566, 226.1, 226.2, 226.4, 455/230
See application file for complete search history.

(56) References Cited

U.S. PATENT DOCUMENTS

| | | | |
|---|---|---|---|
| 2004/0102211 A1* | 5/2004 | Ishida | 455/550.1 |
| 2005/0136990 A1 | 6/2005 | Hardacker et al. | |
| 2009/0117849 A1* | 5/2009 | Mizoguchi | 455/41.2 |

FOREIGN PATENT DOCUMENTS

| | | |
|---|---|---|
| JP | 2007-028048 A | 2/2007 |
| JP | 2007-524288 T | 8/2007 |
| JP | 2007-235370 A | 9/2007 |

* cited by examiner

*Primary Examiner* — Nguyen Vo
(74) *Attorney, Agent, or Firm* — Carter, DeLuca, Farrell & Schmidt LLP

(57) ABSTRACT

An apparatus detects a communication state of a wireless communication, detects posture of the apparatus, and controls communication by a wireless communication unit according to the detected posture if it is detected that field intensity of the wireless communication is equal to or less than a predetermined value.

15 Claims, 5 Drawing Sheets

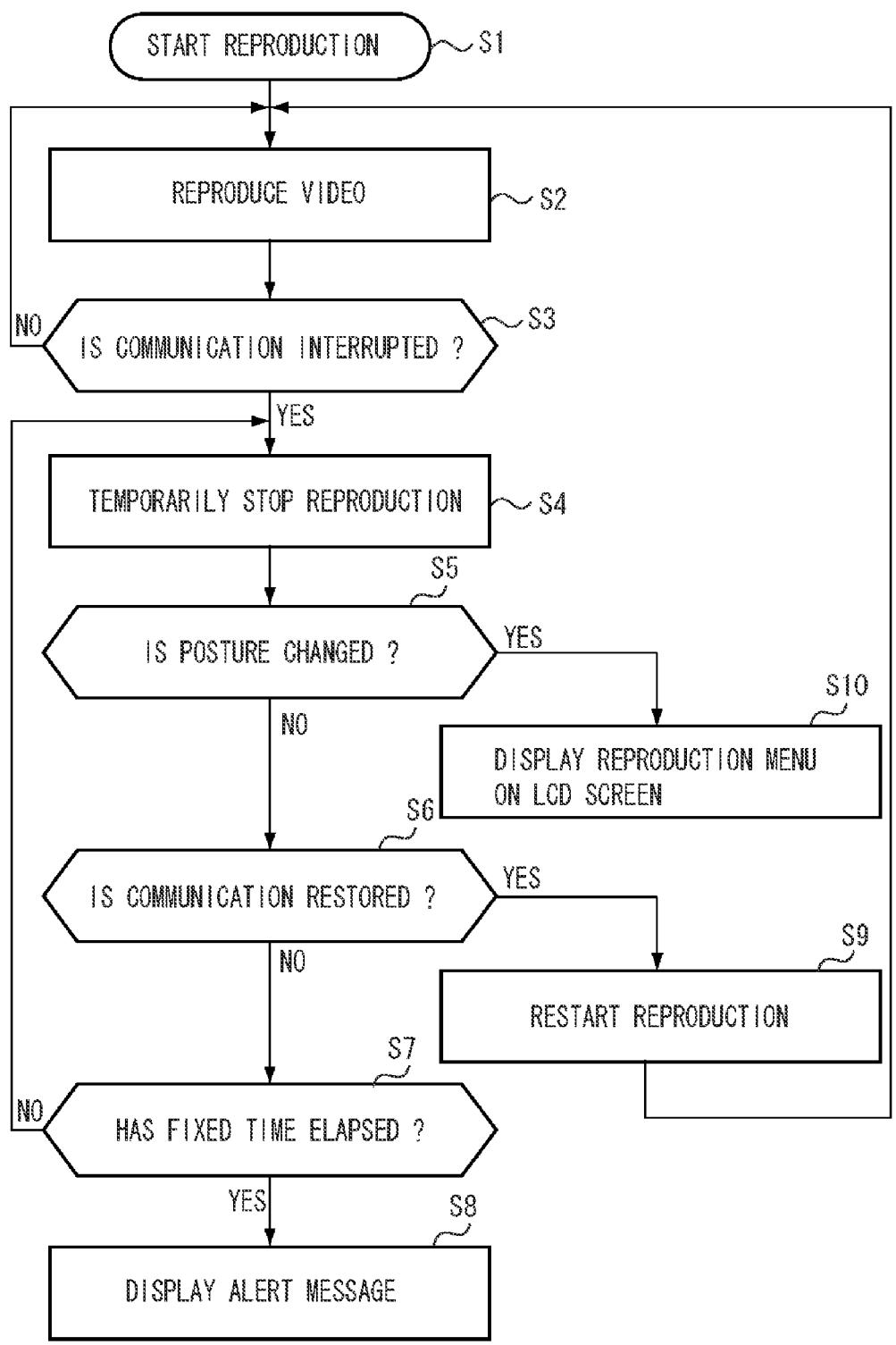

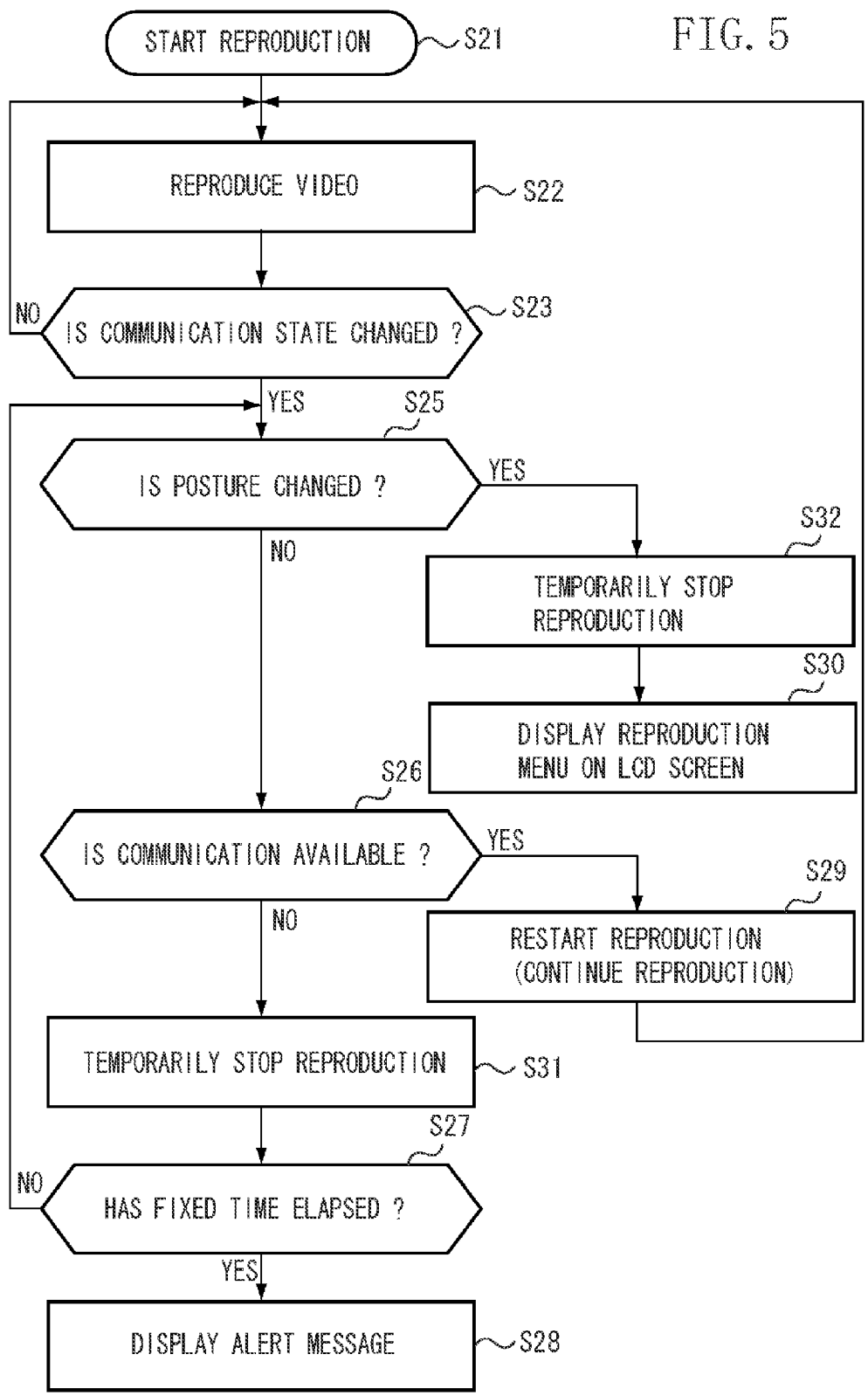

WIRELESS COMMUNICATION APPARATUS, ITS CONTROL METHOD, AND RECORDING MEDIUM

BACKGROUND OF THE INVENTION

1. Field of the Invention

The present invention relates to a wireless communication apparatus which uses a radio wave in a millimeter wave band in communication.

2. Description of the Related Art

As a method for transmitting a high definition video signal using an uncompressed stream in wireless communication, a technique has been known which uses wireless communication in 60 gigahertz (GHz) (millimeter wave) band (refer to Japanese Patent Application Publication No. 2007-524288). Further, in the wireless communication in the millimeter wave band, a radio wave is characterized by its significantly strong straightness, therefore its field intensity is weakened even by a shield with a size of a human body. Thus, there is a problem that communication performance is degraded.

Concerning this problem, Japanese Patent Application Laid-Open No. 2007-235370 discusses a technique in which data volume to be transmitted is controlled according to a radio wave condition, so that image transmission can be executed without interruption. Japanese Patent Application Laid-Open No. 2007-028048 discusses a technique for detecting whether an apparatus is retained by a user and increasing the number of wireless users when the apparatus is retained by the user.

However, the interruption of a radio wave may frequently occur in the wireless communication using the millimeter wave due to its radio property, even under a circumstance in which the interruption does not occur in the conventional wireless communication. For example, the radio wave may be interrupted when an object is passed through between apparatuses communicating with each other and an apparatus with which communication is executed is slightly moved.

For example, when a person or the like passes through a space between apparatuses communicating with each other, and the radio wave temporarily is interrupted, it is desirable that communication is swiftly continued after a radio wave condition is returned. On the other hand, for example, when a user raises portable equipment with which communication is executed to perform some kind of operations and the radio wave is interrupted, there is a high possibility that the user does not expect to continue communication. Thus, it is desirable that a next operation can rather swiftly be executed.

In the aspect of the convenience of a user, a problem arises in that even if the same event, namely the radio wave interruption occurs, a desirable operation of an apparatus is different by a cause of the event.

SUMMARY OF THE INVENTION

According to an aspect of the present invention, an apparatus includes a communication unit configured to execute a wireless communication, a communication state detection unit configured to detect a communication state of the wireless communication, a posture detection unit configured to detect posture of the wireless communication apparatus, and a control unit configured to control communication by the wireless communication unit according to the detected posture if the communication state detection unit detects that field intensity of the wireless communication is equal to or less than a predetermined value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating a control procedure of the reproduction side wireless communication apparatus according to the first exemplary embodiment.

FIG. 5 is a flowchart illustrating a control procedure of the reproduction side wireless communication apparatus according to a second exemplary embodiment.

DESCRIPTION OF THE EMBODIMENTS

Various exemplary embodiments, features, and aspects of the invention will be described in detail below with reference to the drawings.

Figure 1:
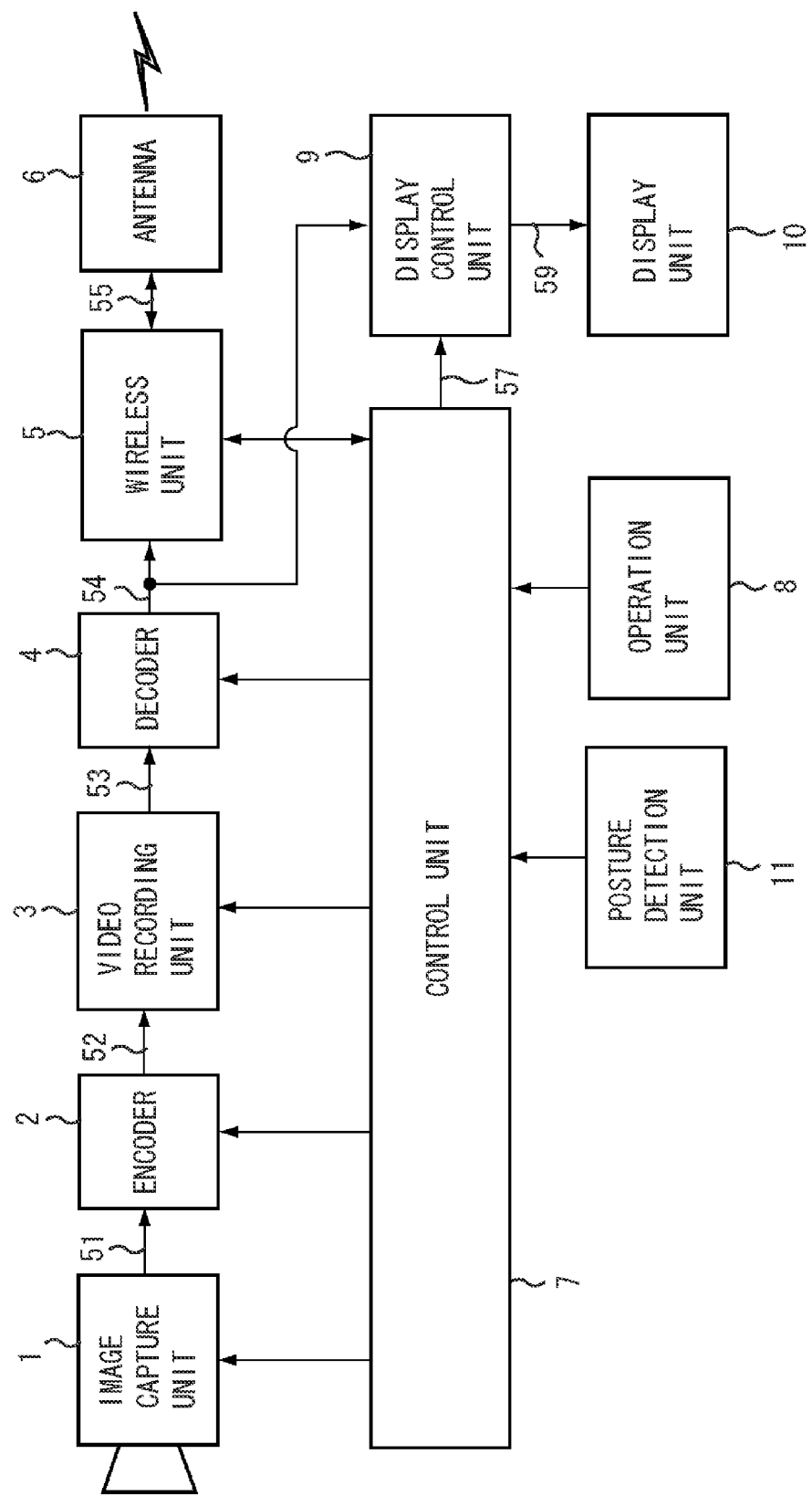
FIG. 1 is a block diagram illustrating a configuration of a reproduction side wireless communication apparatus according to a first exemplary embodiment.

FIG. 1 is a block diagram illustrating a configuration of a reproduction side wireless communication apparatus according to a first exemplary embodiment of the present invention.

Referring to FIG. 1, the configuration of the reproduction side wireless communication apparatus and a normal operation in video reproduction will be described.

As illustrated in FIG. 1, the reproduction side wireless communication apparatus according to the present exemplary embodiment is connected with an image capture unit 1, an encoder 2, a video recording unit 3, a decoder 4, a wireless unit 5, and an antenna 6 in this order. Each unit is connected to a control unit 7 configured to control the entire apparatus. The control unit 7 is connected with an operation unit 8, a display control unit 9, and a posture detection unit 11. The display control unit 9 is connected with a display unit 10. The control unit 7 and the display control unit 9 may be configured as a single piece of hardware.

The video recording unit 3 stores recorded video data 52 which is obtained by compressing and encoding an image capture signal 51 captured by the image capture unit 1 by the encoder 2. When a user performs a reproduction operation by operating the operation unit 8, the control unit 7 detects the user operation and instructs the video recording unit 3 to perform reproduction. The video recording unit 3 outputs reproduction video data 53 according to the reproduction instruction. The decoder 4 expands the read reproduction video data 53 and generates an uncompressed video signal 54.

The display control unit 9 resizes the extracted uncompressed video signal 54 so as to match display resolution of the display unit 10. Further, the display control unit 9 superimposes various types of information 57 such as reproduction time transmitted from the control unit 7 to generate an internal display video signal 59. The display unit 10 displays the internal display video signal 59 generated by the display control unit 9.

On the other hand, the wireless unit 5 modulates the uncompressed video signal 54 to output a modulating signal 55 (video signal of an uncompressed stream formation). The antenna 6 transmits the modulating signal 55. The control unit 7 controls operation timing of these units. Wireless communication is performed bidirectionally and can transmit and receive a control command or the like by multiplexing into video data. The control command or the like output from the control unit 7 is superimposed on the modulating signal 55 in the wireless unit 5 and transmitted from the antenna 6.

The control signal superimposed on the modulating signal 55 received by the antenna 6 is separated in the wireless unit 5 to be notified the control unit 7. The posture detection unit 11 detects movement and a change in posture of the reproduction side wireless communication apparatus by an acceleration sensor and outputs a detection result to the control unit 7. The reproduction side wireless communication apparatus in the present exemplary embodiment communicates with an external device using a highly directive beam using a radio wave in the millimeter wave band.

As a mechanism for detecting a posture used in the posture detection unit 11, in addition to the acceleration sensor, a posture sensor such as an inclination switch and a gyroscope sensor may be used. Further, when the reproduction side wireless communication apparatus is a video camera or the like, a camera shake detecting unit may be incorporated. Accordingly, a sensor output of the camera shake detecting unit may also be used in the posture detection. If the camera shake detecting unit is used, the whole or a part of the camera shake correction unit is activated during communication even if image capturing is not performed. When the reproduction side wireless communication apparatus is a digital still camera, a posture sensor for detecting an image capture direction maybe incorporated. Thus, the built-in posture sensor may be used. Further, a result of distance measuring can be combined. For example, a distance measuring system by an ultrasonic wave and a radio wave may be used. Depending on a type of a radio wave to be used in communication, distance measuring can simultaneously be executed with communication. Thus, it may be used for posture detection.

Figure 2:
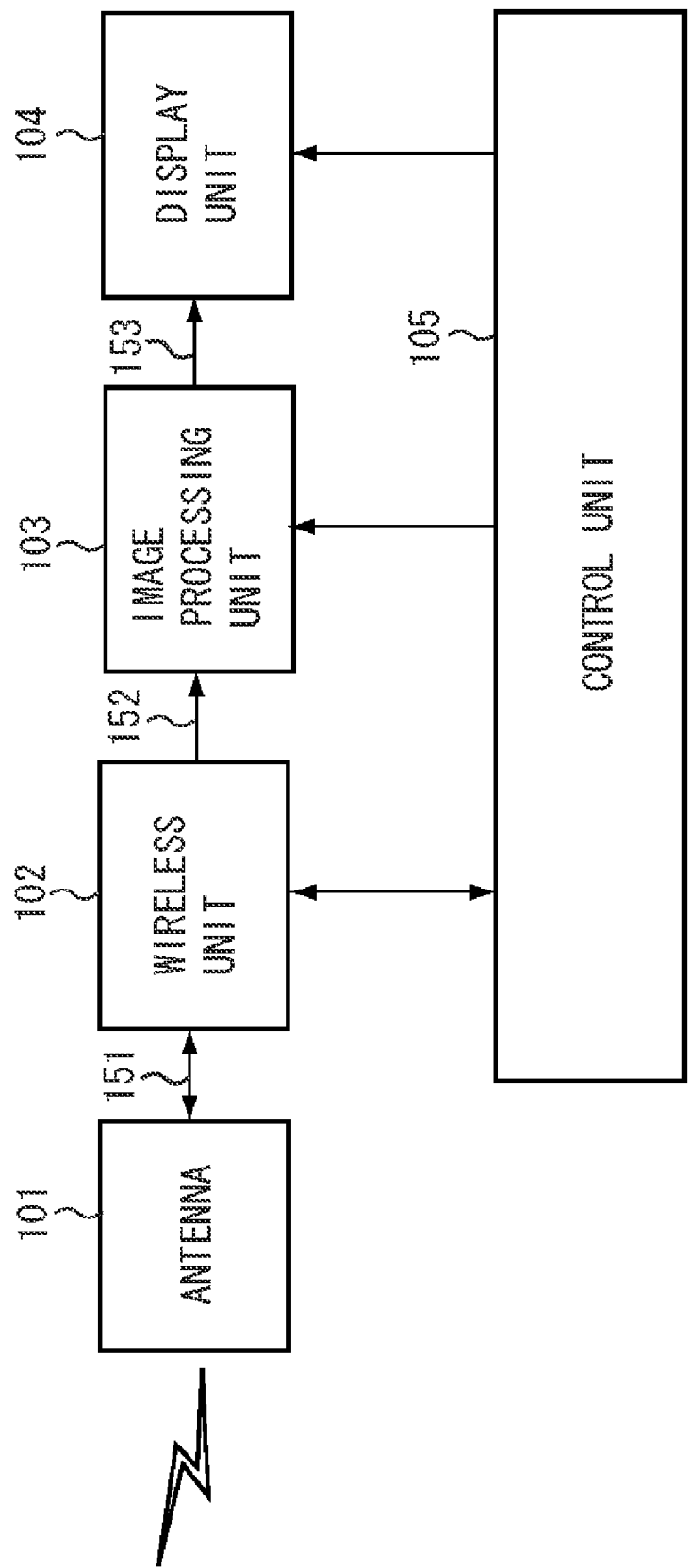
FIG. 2 is a block diagram illustrating a configuration of a display side wireless communication apparatus according to the first exemplary embodiment.

FIG. 2 is a block diagram illustrating a configuration of a display side wireless communication apparatus according to the first exemplary embodiment of the present invention. Referring to FIG. 2, the configuration of the display side wireless communication apparatus and a normal operation in video reproduction will be described.

As illustrated in FIG. 2, the display side wireless communication apparatus according to the present exemplary embodiment is connected with an antenna 101, a wireless unit 102, an image processing unit 103, and a display unit 104 in this order. A control unit 105 is connected to each of these units.

The antenna 101 receives the radio wave transmitted from the above-described reproduction side wireless communication apparatus and outputs a modulating signal 151. The wireless unit 102 demodulates the modulating signal 151 to output an uncompressed video signal 152. The image processing unit 103 executes resolution conversion, image quality adjustment and the like to the uncompressed video signal 152 to output a display signal 153. The display unit 104 displays the display signal 153.

The control unit 105 controls operation timing of these units. Wireless communication is performed bidirectionally and can transmit and receive a control command or the like by multiplexing into video data. The control command or the like output from the control unit 105 is superimposed on the modulating signal 151 in the wireless unit 102 and transmitted from the antenna 101. The control signal or the like superimposed on the modulating signal 151 received by the antenna 101 is separated in the wireless unit 102 to be notified the control unit 105.

Next, referring to FIG. 3, a control procedure in the reproduction side wireless communication apparatus in the present exemplary embodiment will be described.

FIG. 3 is a flowchart illustrating a control procedure in the reproduction side wireless communication apparatus according to the first exemplary embodiment.

First, in step S1, when start of a reproduction operation is instructed based on a user input from the operation unit 8 and reception of a control command by communication, the control unit 7 advances the processing to step S2. In step S2, the control unit 7 executes control of video reproduction to execute the video reproduction operation described above using FIG. 1. The video reproduction processing is an example of data communication processing.

In step S3, the control unit 7 refers to a status of the wireless unit 5 to perform communication state detection processing, and determines whether the wireless communication is interrupted. More specifically, the control unit 7 detects field intensity and determines that the wireless communication is interrupted when the detected field intensity is zero. When it is determined that the radio wave is not interrupted (NO in step S3), the processing returns to step S2 and reproduction of a video is continued. On the other hand, when it is determined that the radio wave is interrupted (YES in step S3), the processing proceeds to step S4. In step S4, the control unit 7 temporarily stops video reproduction.

In subsequent step S5, the control unit 7 checks output of the posture detection unit 11. When it is determined that a change in posture of the reproduction side wireless communication apparatus is detected (YES in step S5), the processing proceeds to step S10. More specifically, when output of the posture detection unit 11 is equal to or greater than a predetermined range, it is determined that the posture has been changed. Processing in steps S4 and S5 is automatically consecutively executed. Accordingly, possibility that the change in posture can be detected when communication is interrupted is increased.

Figure 4A:
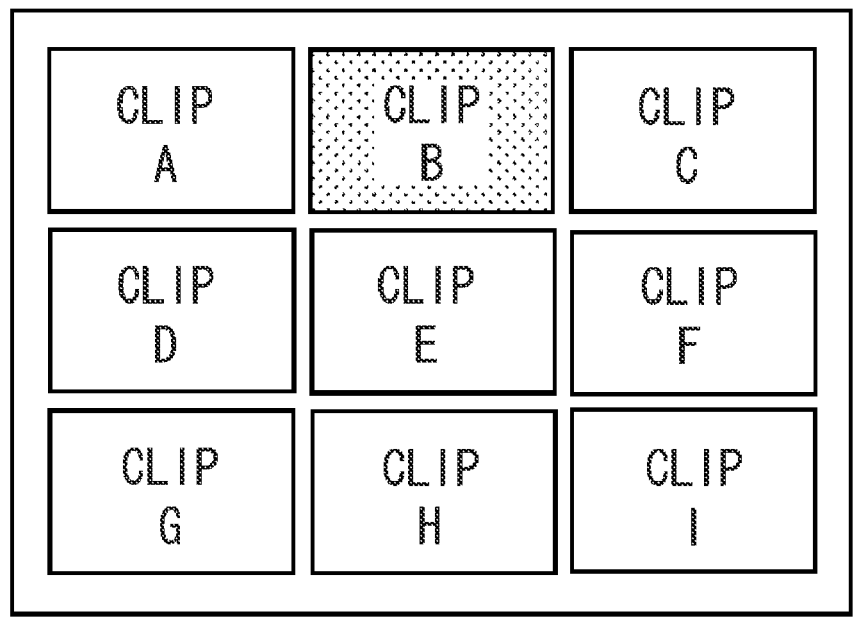
FIG. 4A illustrates a clip selection screen displayed on a display unit of the reproduction side wireless communication apparatus.

In step S10, the control unit 7 causes the display unit 10 to display a reproduction menu screen thereon and waits for a user operation. The reproduction menu screen to be displayed is a clip selection screen by a thumbnail list of reproduction videos, for example, as illustrated in FIG. 4A.

If the change in posture is detected by the posture detection unit 11, the control unit 7 determines that the user performs an action such as raising an apparatus to operate the reproduction side wireless communication apparatus, so that the change in posture is detected. Accordingly, the control unit 7 does not need to return to video reproduction and displays a menu screen by anticipating an action that the user will perform next.

On the other hand, in step S5, when the change in posture is not detected (NO in step S5), the processing proceeds to step S6. In step S6, the control unit 7 refers to the status of the wireless unit 5 to determine whether the wireless communication is restored. More specifically, when field intensity is restored to a value equal to or greater than a predetermined value, the control unit 7 determines that wireless communication is restored. When it is determined that communication is restored (YES in step S6), the processing proceeds to step S9. When it is determined that communication is not restored (NO instep S6), the processing proceeds to step S7.

In step S7, the control unit 7 checks time elapsed from detection of interruption of a radio wave in step S3 using a timer (not illustrated). When the elapsed time is equal to or shorter than predetermined standby time (NO in step S7), the processing returns to step S5. When the elapsed time has passed the standby time (YES in step S7), the processing proceeds to step S8.

The standby time in step S7 may be determined based on time that communication is interrupted, for example, when the human body passes through a wireless channel and time that a user can permit to an unexpected temporary stop of reproduction. For example, it is assumed that it takes one second for the human body to pass through and one second to reconnect the communication, so that total time is provided by two seconds or longer. When an average user can accept temporary stop about three seconds, standby time can be set to three seconds in consideration of a margin or the like. However, if a different time period is set in consideration of other factors, the present invention can be realized. If the standby time is set to zero, the processing is directly proceeds to step S8 and a message can be displayed.

In step S8, the control unit 7 causes the display unit 10 to display an alert message such as "since a radio wave has been interrupted, reproduction is stopped" thereon and ends a series of control processing. In step S9, the control unit 7 executes restart processing of reproduction. Then, the processing returns to step S2.

In the above-described control processing, a flow corresponding to a state in which a change in posture is detected and communication is not interrupted is not particularly indicated. However, in this state, reproduction is continued without stopping by the determination in step S3. More specifically, in this state, it is considered that the posture detection unit 11 is erroneously reacted or small vibration is provided to the apparatus. In this case, it is considered that the apparatus is not moved to the extent of raising it to perform an operation and reproduction of a video can be continued. Accordingly, if only a change in posture is detected, processing flow does not branch particularly.

In the present exemplary embodiment, an alert message is displayed when communication is not restored. However, there is a method in which a wireless channel is changed. For example, when communication is interrupted and a change in posture is absent, it is estimated that a relative position between the reproduction side wireless communication apparatus and the display side wireless communication apparatus is not changed. Thus, using a beam steering technique utilizing, for example, reflection from a wall or the like, the wireless channel can be changed.

According to the above described control procedure, a wireless communication apparatus is realized which can select an operation corresponding to a cause of interruption when wireless communication in the millimeter wave band is interrupted. More specifically, a reproduction side wireless communication apparatus can be provided which can try to continue reproduction when it is determined that interruption is temporary, such that a human body crosses the communication channel, and display a menu when it is determined that a user moved the apparatus.

An example of a modification according to the first exemplary embodiment includes the followings.

(1)According to types of the reproduction side wireless communication apparatus, a display function of the display unit 10 may be invalidated during video reproduction for the purpose of electric power saving or the like. When the display function is invalid, in step S10 illustrated in FIG. 3, the display function of the display unit 10 may be validated prior to display of a menu. Alternatively, in step S3, the display function of the display unit 10 may be validated.

Figure 4B:
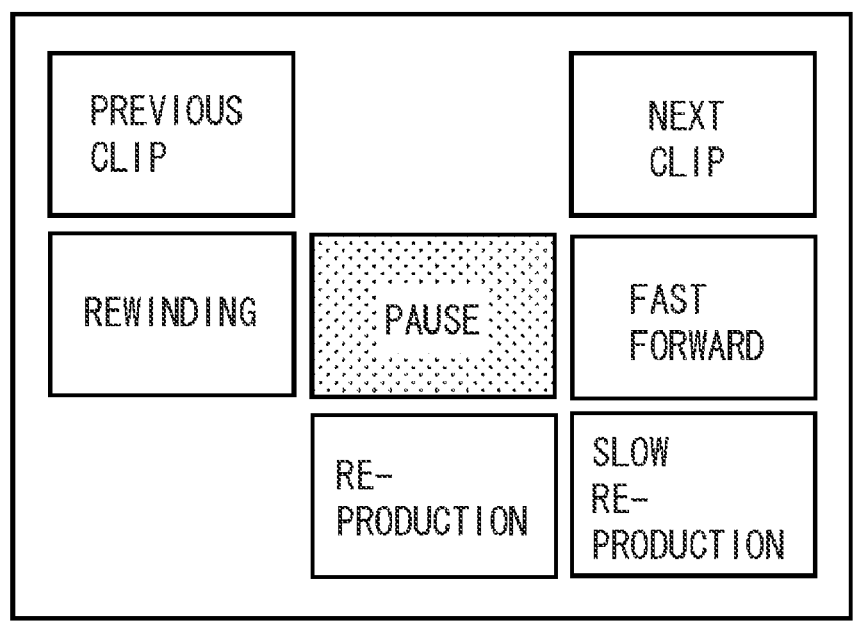
FIG. 4B illustrates a reproduction operation screen displayed on a display unit of the reproduction side wireless communication apparatus.

(2) If the menu to be displayed in step S10 is a menu other than a thumbnail list, the present invention can be implemented by a similar procedure described above. For example, a reproduction control-related menu (rewinding, pause, fast forward, reproduction, slow reproduction, etc.) as illustrated in FIG. 4B may be displayed. Further, a still image of the video which is temporarily stopped the reproduction may be displayed as a background of the menu.

(3) The present exemplary embodiment is described using as an example the apparatus which executes wireless communication accompanied by video reproduction. However, the present invention can be implemented if the content of communication is not particularly limited. For example, if the apparatus reproduces a voice by wireless communication, the present invention can similarly be implemented.

The present invention can be applied to a communication system which can continue low-speed communication and control communication by slowing a communication speed without abruptly being incommunicable when a radio wave condition is deteriorated. In a second exemplary embodiment, processing of such a case will be described.

The configuration of an apparatus and a normal operation in the second exemplary embodiment are similar to those in the first exemplary embodiment which are described using FIGS. 1 and 2. However, the wireless unit 5 on the reproduction side wireless communication apparatus and the wireless unit 102 on the display side wireless communication apparatus have a function of automatically switching to low-speed communication by executing a modulation high in redundancy when deterioration of a wireless state is detected.

Next, referring to FIG. 5, a control procedure in the reproduction side wireless communication apparatus in the present exemplary embodiment will be described.

FIG. 5 is a flowchart illustrating the control procedure in the reproduction side wireless communication apparatus according to the second exemplary embodiment.

In steps S21 and S22 illustrated in FIG. 5, the control unit 7 executes processing similar to that in steps S1 and S2 illustrated in FIG. 3 respectively. In subsequent step S23, the control unit 7 refers to the status of the wireless unit 5 to determine whether a communication state of wireless communication is changed. More specifically, when it is determined that the field intensity is equal to or less than a predetermined value, it is determined that the communication state is changed. When it is determined that the communication state is not changed (NO in step S23), the processing returns to step S22 and reproduction of a video is continued. On the other hand, when it is determined that the communication state is changed (YES in step S23), the processing proceeds to step S25.

Other methods for detecting a change in the communication state in step S23 include, for example, the followings: (a) a method, when an error correction is included in a communication protocol, that uses an error rate thereof; (b) a method, when it is a system in which a communication speed thereof is changed according to the communication state, that uses the communication speed; and (c) a method, when it is a system that transmits and receives a packet by a handshake procedure, that uses a response status of its acknowledgement. Further, in the case of a system in which it is difficult to directly detect a change in the communication state on the transmission side, the receiving side may notify the transmission side of the communication state by a control command.

In step S25, the control unit 7 determines output of the posture detection unit 11. When it is determined that a change in posture is detected (YES in step S25), the processing proceeds to step S32. On the other hand, when it is determined that a change in posture is not detected (NO in step S25), the processing proceeds to step S26. In step S32, the control unit 7 temporarily stops reproduction of a video. In next step S30, the control unit 7 causes the display unit 10 to display a menu screen thereon and waits for a user operation.

In step S26, the control unit 7 refers to the status of the wireless unit 5 to determine whether the communication state is in a video reproducible state. More specifically, for example, when the field intensity is equal to or greater than a predetermined value, it is determined that wireless communication is restored. If it is in a video reproducible state (YES in step S26), the processing proceeds to step S29. When it is not in a video reproducible state (NO in step S26), the processing proceeds to step S31.

In step S29, when the reproduction is under suspension, the control unit 7 executes restart processing of the reproduction and when the reproduction is being executed, the control unit 7 continues the reproduction without executing any operation. Then, the processing returns to step S22. In step S31, the control unit 7 temporarily stops reproduction of a video. In step S27, the control unit 7 checks time elapsed after a change in the communication state is detected in step S23 using a timer (not illustrated). When the elapsed time is equal to or shorter than predetermined standby time (NO in step S27), the processing returns to step S25. When the elapsed time has passed the standby time (YES in step S27), the processing proceeds to step S28.

In step S28, the control unit 7 causes the display unit 10 to display an alert message such as "since a radio wave has been interrupted, reproduction is stopped" thereon and ends a series of control processing.

According to the control procedure in the present exemplary embodiment described above, an operation can be selected before communication is interrupted. Thus, an operation in response to user's intention can be executed.

Further, according to the present exemplary embodiment, a wireless communication apparatus is realized which can select an operation in response to a cause of a change when the communication state of wireless communication in the millimeter wave band is changed. More specifically, a reproduction side wireless communication apparatus can be provided which can try to continue reproduction in the case of a temporary change, such that a human body crosses the communication channel, and display a menu when it is determined that a user moved the apparatus.

An example of a modification according to the second exemplary embodiment includes the followings. With respect to the control illustrated in the above-described steps S31, S27 and S28, which is executed when the communication state is deteriorated and a change in posture is not detected, even if control is different from the control example illustrated in the present exemplary embodiment, the present invention can be implemented. For example, if communication can be established at a slow transmission speed, reproduction can also be continued by compressing a video, reducing image quality, and decreasing data volume.

The present invention can also be accomplished by an exemplary embodiment in which a storage medium recording a program code of software which realizes functions of the above-described exemplary embodiments are supplied to a system or an apparatus, and the program code of software causes a computer (or a central processing unit (CPU), a micro processing unit (MPU), etc.) on the system or the apparatus to function as a unit corresponding to processing.

Further, as the storage medium for supplying a program code, the followings can be used, for example, a floppy disk, a hard disk, a magneto-optical disk, a compact disc read only memory (CD-ROM), a CD-recordable (CD-R), a CD-rewritable (CD-RW), a digital versatile disc-ROM (DVD-ROM), a DVD-random access memory (DVD-RAM), a DVD-RW, a DVD+RW, a magnetic tape, a nonvolatile memory card, and a ROM. Furthermore, the program code may be downloaded via a network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-069948 filed Mar. 23, 2009, which is hereby incorporated by reference herein in its entirety.

What is claimed is:

1. An apparatus comprising:
   a communication unit configured to execute a wireless communication;
   a communication state detection unit configured to detect a communication state of the wireless communication;
   a posture detection unit configured to detect posture of the apparatus; and
   a control unit configured to control communication by the communication unit according to the detected posture if the communication state detection unit detects that field intensity of the communication is equal to or less than a predetermined value.

2. The apparatus according to claim 1, further comprising:
   a display unit; and
   an operation unit configured to receive an operation,
   wherein the display unit displays a screen for prompting a user to execute a next operation if the communication state detection unit detects that the field intensity is equal to or less than the predetermined value and the posture detection unit detects a change in the posture.

3. The apparatus according to claim 2, wherein the screen is a selection screen for selecting data to be transmitted to an external device.

4. The apparatus according to claim 2, wherein the screen is a menu screen for controlling reproduction of data.

5. The apparatus according to claim 2, wherein the control unit does not execute processing for continuing the wireless communication if the communication state detection unit detects that the field intensity is equal to or less than the predetermined value and the posture detection unit detects a change in the posture.

6. The apparatus according to claim 1, wherein the wireless communication uses a radio wave in a millimeter wave band.

7. The apparatus according to claim 1, wherein the control unit executes processing for continuing the wireless communication if the field intensity is equal to or less than the predetermined value and the posture detection unit does not detect a change in the posture.

8. The apparatus according to claim 7, wherein the processing for continuing the wireless communication includes processing for changing a channel of the wireless communication.

9. A method comprising:
   executing a wireless communication;
   detecting a communication state of the wireless communication;

detecting posture of the wireless communication apparatus; and controlling communication by a wireless communication unit according to the detected posture if it is detected that field intensity of the wireless communication is equal to or less than a predetermined value.

10. The method according to claim 9, further comprising:

receiving an operation, displaying a screen for prompting a user to execute a next operation if the detecting detects that the field intensity is equal to or less than the predetermined value and the detecting detects a change in the posture.

11. The method according to claim 10, wherein the screen is a selection screen for selecting data to be transmitted to an external device.

12. The method according to claim 10, wherein the screen is a menu screen for controlling reproduction of data.

13. The method according to claim 9, wherein the wireless communication uses a radio wave in a millimeter wave band.

14. The method according to claim 9, further comprising executing processing for continuing the wireless communication if the field intensity is equal to or less than the predetermined value and the detecting does not detect a change in the posture.

15. The method according to claim 14, wherein the executing processing for continuing the wireless communication includes executing processing for changing a channel of the wireless communication.

* * * * *